United States Patent
Hu et al.

(10) Patent No.: US 12,316,980 B2
(45) Date of Patent: May 27, 2025

(54) METHOD AND SYSTEM FOR DE-FLICKERING FRAMES

(71) Applicant: MEDIATEK INC., Hsin-Chu (TW)

(72) Inventors: Shih-Wei Hu, Hsinchu (TW);
Chieh-Kai Kao, Hsinchu (TW);
Gang-Wei Fan, Hsinchu (TW);
Shao-Hsiang Chang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 223 days.

(21) Appl. No.: 18/198,836

(22) Filed: May 17, 2023

(65) Prior Publication Data
US 2024/0388808 A1 Nov. 21, 2024

(51) Int. Cl.
*H04N 23/745* (2023.01)
*H04N 23/71* (2023.01)
*H04N 25/50* (2023.01)

(52) U.S. Cl.
CPC ........... *H04N 23/745* (2023.01); *H04N 23/71* (2023.01); *H04N 25/50* (2023.01)

(58) Field of Classification Search
CPC ....... H04N 23/745; H04N 23/71; H04N 25/50
See application file for complete search history.

(56) References Cited

U.S. PATENT DOCUMENTS 7,990,433 B2 * 8/2011 Yamashita ............. H04N 23/73
348/222.1

* cited by examiner

*Primary Examiner* — James M Hannett
*Assistant Examiner* — Angel L Garces-Rivera
(74) *Attorney, Agent, or Firm* — Winston Hsu (57) ABSTRACT

A method for de-flickering frames captured by a camera including capturing a first frame with short exposure to generate a first short exposure frame, capturing the first frame with long exposure to generate a first long exposure frame, generating brightness energy information of the first frame according to the first short exposure frame and the first long exposure frame, generating a first set of parameters according to the brightness energy information of the first frame, generating brightness energy information of N next frames after the first frame according to the first set of parameters and the brightness energy information of the first frame, and generating de-flicker scalars of the N next frames after the first frame according to the brightness energy information of the N next frames after the first frame.

19 Claims, 5 Drawing Sheets

METHOD AND SYSTEM FOR DE-FLICKERING FRAMES

BACKGROUND

High dynamic range (HDR) imaging is a technique that captures images with a wide range of brightness levels, from very dark to very bright. This allows for more details and contrast in both shadows and highlights, which are often lost in conventional imaging methods. High dynamic range imaging can be achieved by combining multiple exposures of the same scene with different exposure settings, or by using sensors and algorithms that can capture and process a high dynamic range of light intensities. It has applications in various fields, such as photography, astronomy, medical imaging, and computer graphics. Video high dynamic range (VHDR) imaging is a similar technique that captures and displays a wide range of luminance values in a video sequence. It allows for more realistic and detailed representation of scenes with high contrast. Similarly, video high dynamic range imaging can be achieved by using multiple exposures, tone mapping, or sensor fusion methods. It also has applications in various fields, such as cinematography, surveillance, and medical imaging.

Due to periodicity of alternating current (AC) lighting and the rolling shutter effects of CMOS cameras, when capturing a HDR image or video under a condition of mismatched camera shutter and AC lighting, it results in appearance of obvious bright bands and dark bands in the captured image or video. This is called temporal brightness artifacts and more specifically, the banding effect.

De-flickering is the process of removing the temporal brightness artifacts in an image or a video sequence. A common approach for de-flickering is to estimate the global or local intensity changes between consecutive frames, and then compensate for them by adjusting the pixel values accordingly. It is usually done by multiplying each row of the image by a specific scalar to compensate the aforementioned temporal brightness artifacts.

However, de-flickering algorithms are also computationally costly, as they require processing a large amount of data and performing complex operations such as temporal filtering, histogram matching, or optimization. These algorithms are too costly for most mobile devices. Therefore, designing efficient and effective de-flickering algorithms is a challenging task that involves balancing the trade-off between quality and speed.

SUMMARY

An embodiment provides a method for de-flickering frames captured by a camera. The method includes capturing a first frame with short exposure to generate a first short exposure frame, capturing the first frame with long exposure to generate a first long exposure frame, generating brightness energy information of the first frame according to the first short exposure frame and the first long exposure frame, generating a first set of parameters according to the brightness energy information of the first frame, generating brightness energy information of N next frames after the first frame according to the first set of parameters and the brightness energy information of the first frame, and generating de-flicker scalars of the N next frames after the first frame according to the brightness energy information of the N next frames after the first frame. N is a positive integer.

Another embodiment provides a camera for de-flicker frames. The camera includes an image sensor and a processor coupled to the image sensor. The image sensor is used to capture a frame with short exposure to generate a short exposure frame, and capture the frame with long exposure to generate a long exposure frame. The processor is used to generate brightness energy information of the frame according to the short exposure frame and the long exposure frame, generate parameters according to the brightness energy information of the frame, generate brightness energy information of N next frames after the frame according to the parameters and the brightness energy information of the frame, and generate de-flicker scalars of the N next frames after the frame according to the brightness energy information of the N next frames after the frame. N is a positive integer.

These and other objectives of the present invention will no doubt become obvious to those of ordinary skill in the art after reading the following detailed description of the preferred embodiment that is illustrated in the various figures and drawings.

DETAILED DESCRIPTION

The present disclosure may be understood by reference to the following detailed description, taken in conjunction with the drawings as described below, and for purposes of illustrative clarity and being easily understood by the readers, various drawings of this disclosure may be simplified, and the elements in various drawings may not be drawn to scale. In addition, the number and dimension of each element shown in drawings are just illustrative and are not intended to limit the scope of the present disclosure.

It should be noted that the technical features in different embodiments described in the following may be replaced, recombined, or mixed with one another to constitute another embodiment without departing from the essence of the disclosure.

In order to effectively solve the aforementioned problem, the key comes from the interaction between modern lighting technology and mobile cameras. The modern mobile cameras mainly adopt complementary metal-oxide semiconductor (CMOS) sensors with rolling shutter mechanism. Due to hardware limitations, the rolling shutter mechanism introduces a small delay among the exposure of pixel rows. This implies that, if the light conditions fluctuate temporally during the exposure, the variation will turn into spatial distortions due to the exposure delay in rows and eventually result in band-like distortions termed the banding effect on the image or frame. One way to remove the banding effect is to apply de-flicker scalar on each row to de-flicker the image or frame. The method provided by the embodiment uses the ratio between a short exposure frame and a long exposure frame to estimate the de-flicker scalar for each row of that frame. The details are described in the following paragraphs.

Figure 1:
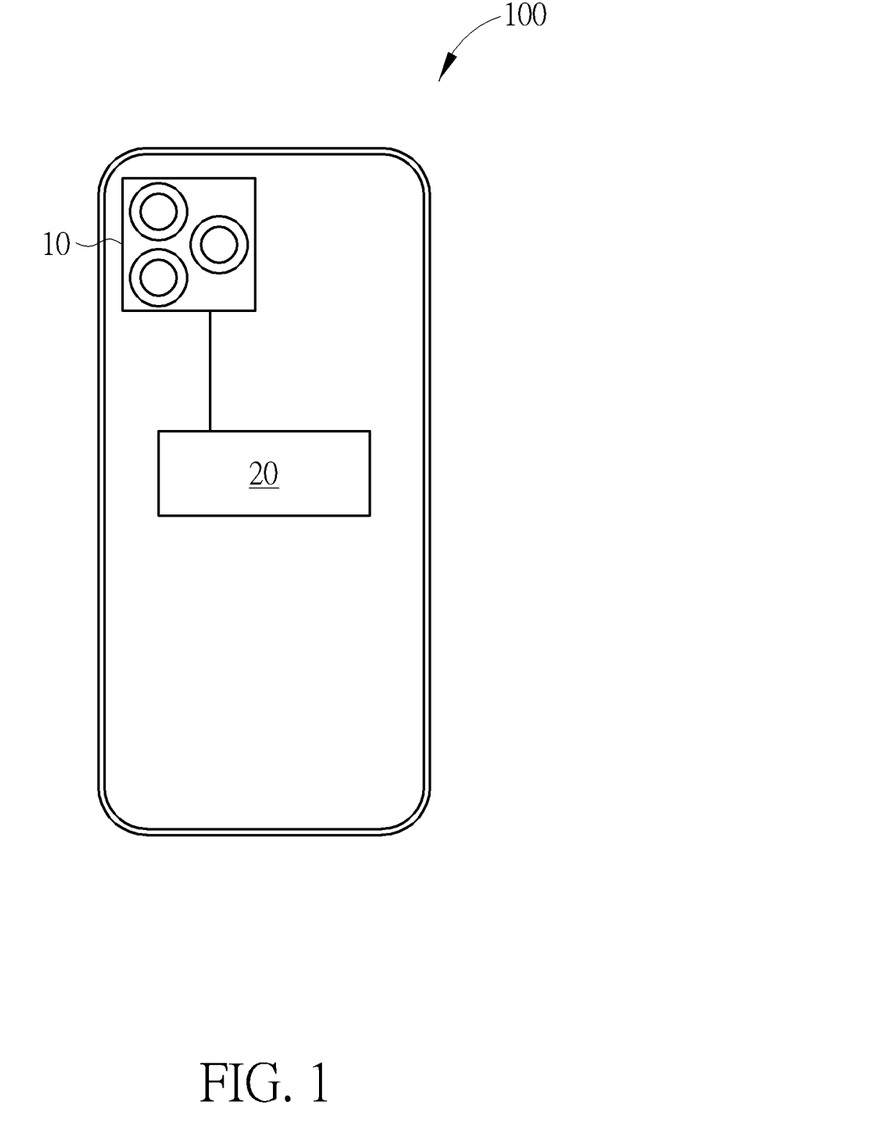
FIG. 1 illustrates a camera for de-flickering frames of an embodiment.

FIG. 1 illustrates a camera 100 for de-flickering frames of an embodiment. The camera 100 includes one or more image sensors 10 and a processor 20 coupled to the image sensors 10. The image sensors 10 can be CMOS sensors with rolling shutter mechanism. The processor 20 may be any combination of general purpose or special purpose processors such as central processing unit (CPU), graphic processing unit (GPU), application specific integrated circuit (ASIC), field programmable gate array (FPGA), etc.

Figure 2A:
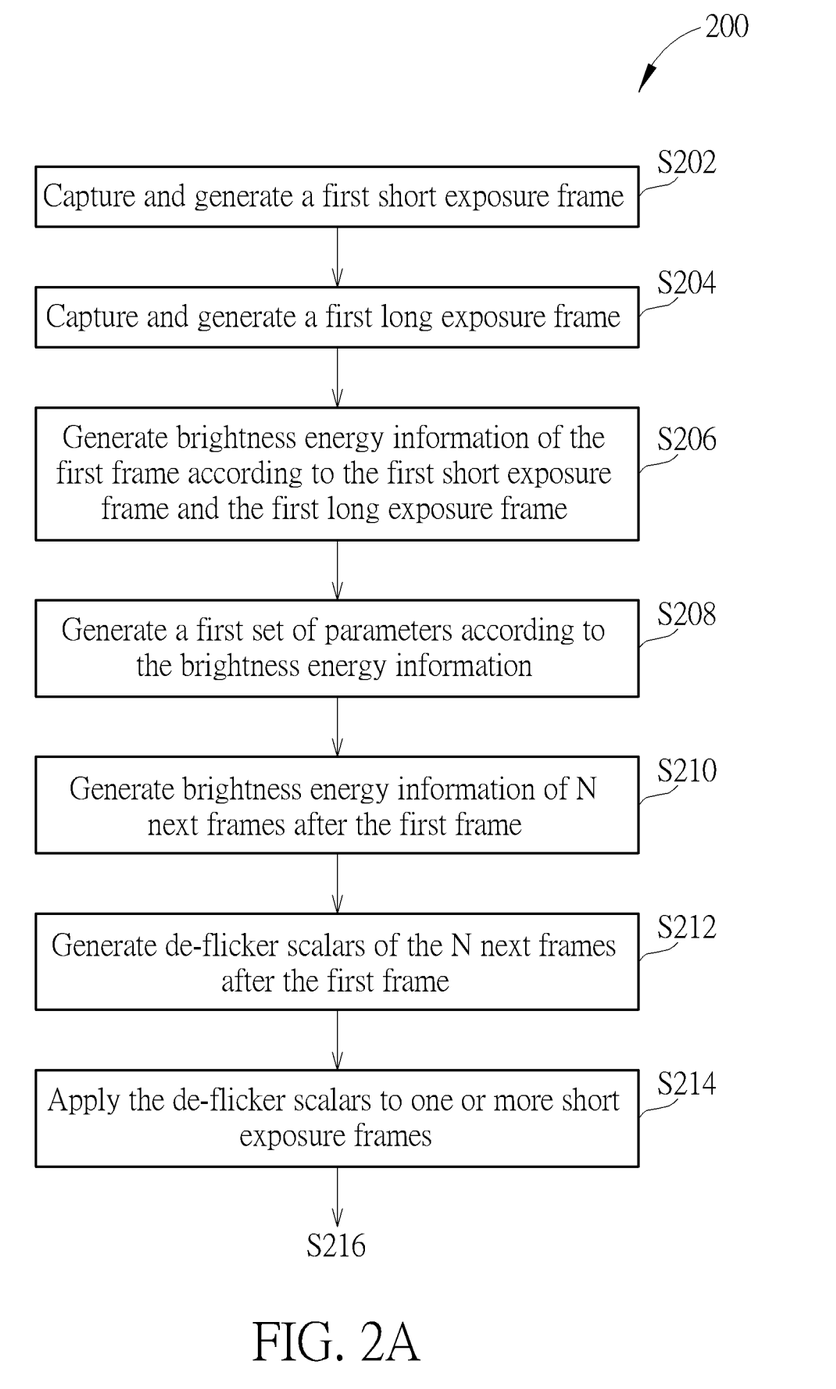
FIGS. 2A and 2B are flowcharts of method of an embodiment for de-flickering frames captured by the camera in FIG. 1.
Figure 2B:
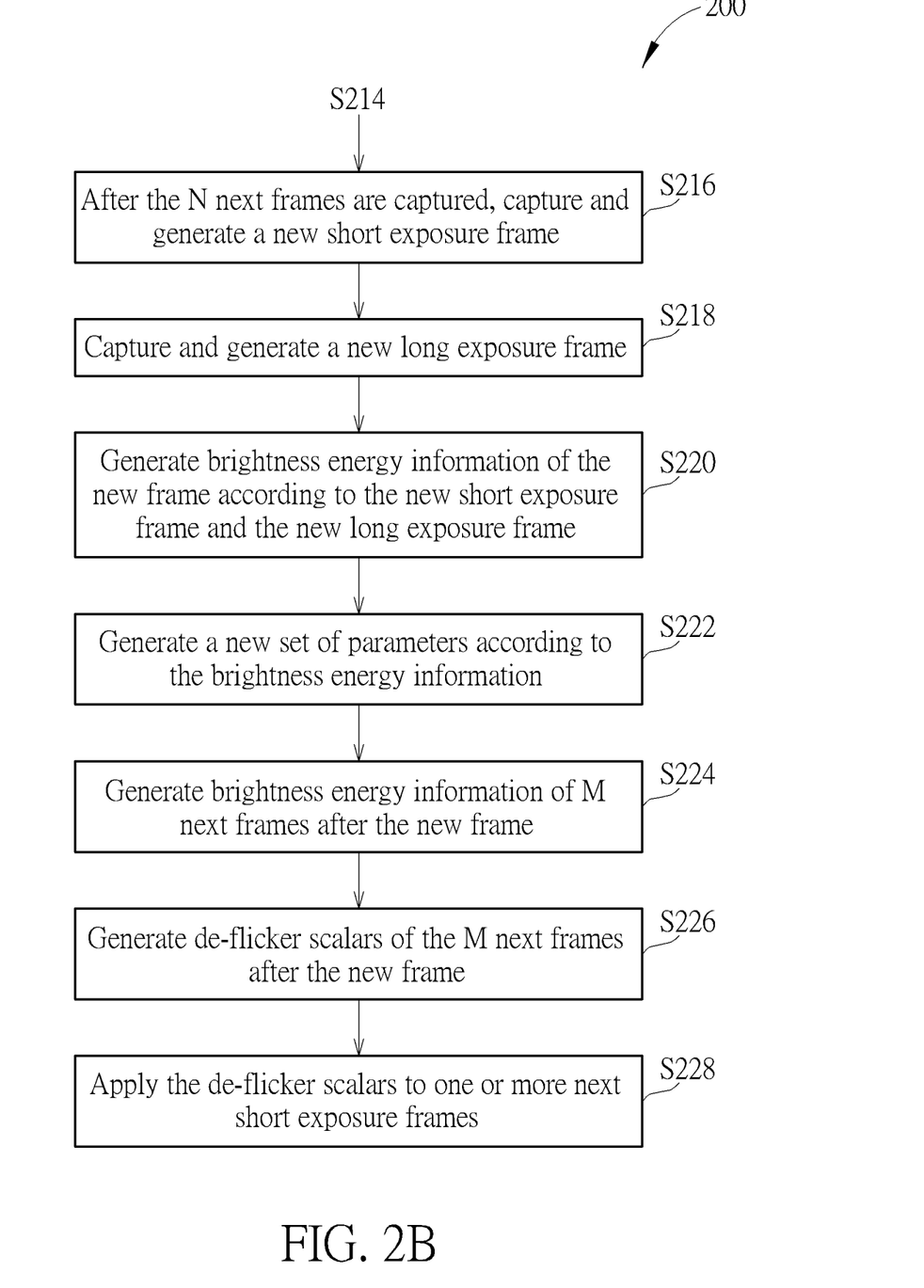

FIGS. 2A and 2B are flowcharts of method 200 for de-flickering frames captured by the camera 100. The method 200 includes the following steps:

S202: Capture a first frame with short exposure to generate a first short exposure frame;

S204: Capture the first frame with long exposure to generate a first long exposure frame;

S206: Generate brightness energy information of the first frame according to the first short exposure frame and the first long exposure frame;

S208: Generate a first set of parameters according to the brightness energy information of the first frame;

S210: Generate brightness energy information of N next frames after the first frame according to the first set of parameters and the brightness energy information of the first frame;

S212: Generate de-flicker scalars of the N next frames after the first frame according to the brightness energy information of the N next frames after the first frame;

S214: Apply the de-flicker scalars to one or more short exposure frames generated by capturing the N next frames after the first frame with short exposure;

S216: After the N next frames are captured, capture a new frame with short exposure to generate a new short exposure frame;

S218: Capture the new frame with long exposure to generate a new long exposure frame;

S220: Generate brightness energy information of the new frame according to the new short exposure frame and the new long exposure frame;

S222: Generate a new set of parameters according to the brightness energy information of the new frame and brightness energy information of a frame prior to the new frame;

S224: Generate brightness energy information of M next frames after the new frame according to the new set of parameters and the brightness energy information of the new frame;

S226: Generate de-flicker scalars of the M next frames after the new frame according to the brightness energy information of the M next frames after the new frame; and S228: Apply the de-flicker scalars to one or more next short exposure frames generated by capturing the M next frames after the new frame with short exposure.

In the above description, the frames are captured by the image sensors 10 and brightness energy information, parameters and de-flicker scalars are generated by the processor 20. Furthermore, N and M are positive integers. In order to obtain the more effective de-flickering, integers N and M can be adoptively tuned based on required visual quality and computation efficiency of the camera. For example, N and M can be smaller (e.g., 5 frames) if visual quality is a priority. On the other hand, N and M can be greater (e.g., 10 frames) if computation efficiency is a priority. Thus, there is a trade-off between them, and N and M can be designed according to actual application. In some embodiments, N can be equal to M. In some embodiments, N and M can be equal to 1.

Figure 3A:
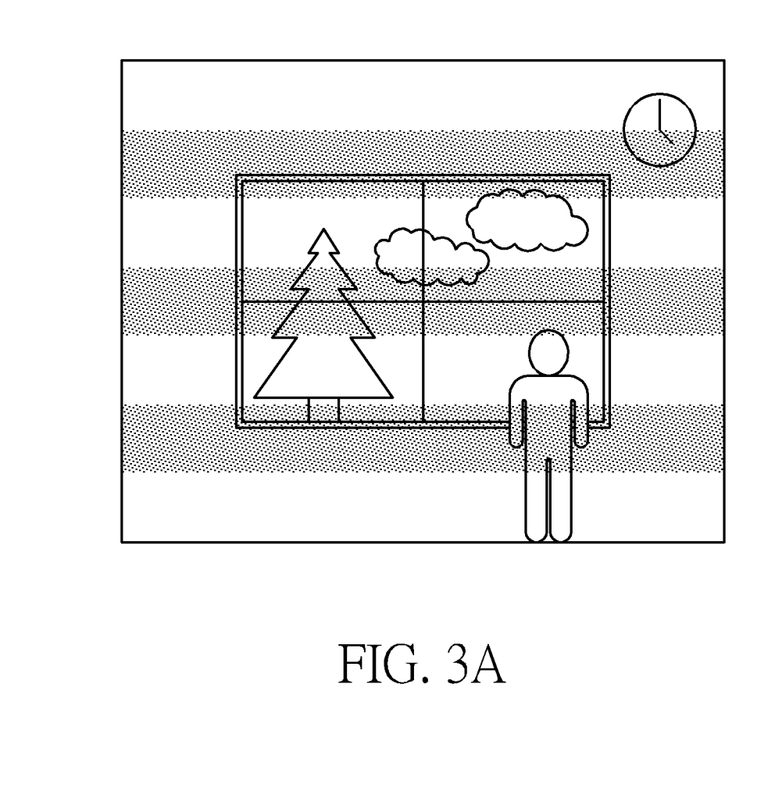
FIG. 3A illustrates a short exposure frame captured and generated by the image sensors in FIG. 1.
Figure 3B:
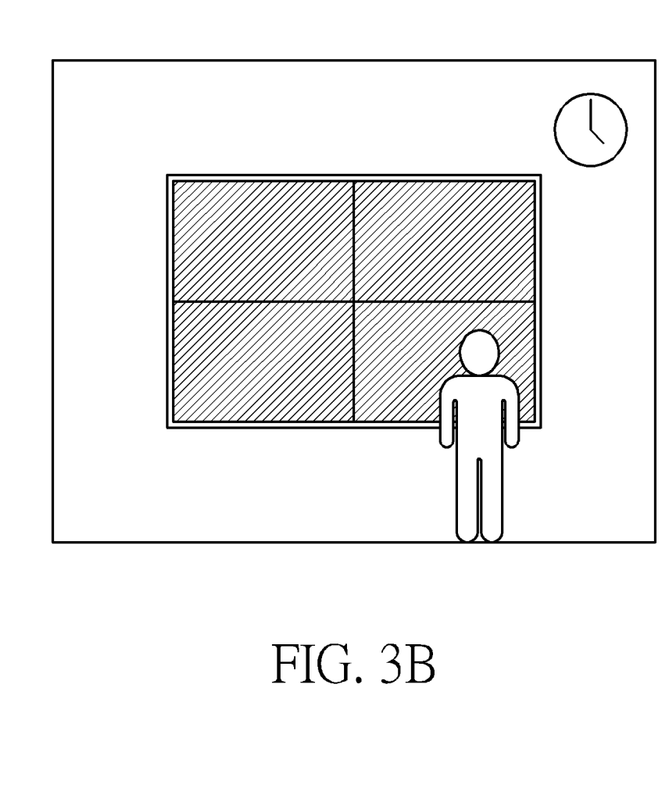
FIG. 3B illustrates a long exposure frame captured and generated by the image sensors in FIG. 1.

FIGS. 3A and 3B illustrate respectively a short exposure frame and a long exposure frame captured and generated by the image sensors 10. In S202 and S204, the image sensors 10 capture the frame with short exposure to generate a first short exposure frame, and capture the frame with long exposure to generate the long exposure frame. Each of the image sensors 10 (i.e., CMOS sensors) contains multiple rows. Each row is exposed for the same amount of time, but due to the limitations of the single-line readout, a small delay, often in the order of nanoseconds, exists between two consecutive rows exposures. Although this mechanism empowers the CMOS sensors with the ability to sense high-frequency temporal variation, it can also cause visual distortions on the resulting image. As light reflected from the physical object and projected into the CMOS sensors, these variations can cause banding effect on the short exposure frame shown in FIG. 3A. For the long exposure frame in FIG. 3B, because of the exposure time is longer than the temporal variation of AC lighting, there is no banding effect. However, the details of the content are lost due to overexposure.

Despite the differences in lighting technology, all commonly-used lights, including incandescent lights, fluorescent lights, as well as light-emitting diodes (LEDs), exhibit different levels of luminance flickers. For instance, an incandescent lamp connected to AC power often creates banding effect at 50 or 60 Hz. As such, the short exposure frame often has exposure time equal to or less than a multiple of $\frac{1}{50}$ or $\frac{1}{60}$ seconds.

Consider a light source with temporal luminance variation as:

$$L(t) = A \sin^2(2\pi f t)$$

A represents the light intensity. f represents the AC frequency. L(t) defines the luminance variation function of light. It should be noted that the temporal variation frequency of light is approximately double the AC frequency. In a typical household, the AC frequency is 60 Hz.

The brightness energy information of each pixel row can be defined by the following Equation 1:

$$E = \int_{t_0}^{t_0+t_e} A \sin^2(2\pi f t) dt = \frac{A}{4\pi f}[2\pi f t_e - \sin(2\pi f t_e)\cos(2\pi f(2t_0 + t_e))]$$

E represents the brightness energy information; A represents the light intensity; $t_0$ represents the starting time of capturing the frame; $t_e$ represents the exposure time of the camera; f represents the AC frequency.

The brightness energy information has three parts: $2\pi f t_e$ is the DC component; $\sin(2\pi f t_e)$ is the flicker ratio and $\cos(2\pi f(2t_0+t_e))$ is the flicker component.

In S206, the brightness energy information E of the first frame can be computed by applying curve fitting (e.g., linear regression) to the first short exposure frame and the first long exposure frame to obtain estimated values of the brightness energy information E. In some embodiments, external information such as the AC frequency f, the exposure time $t_e$, and readout time of rolling shutter can be collected by the camera 100, e.g., camera setting, can be provided externally or can be defined by the user.

Then in S208, with known variables (i.e., brightness energy information E, AC frequency f and exposure time $t_e$) the first set of parameters (i.e., starting time $t_0$ and light intensity A) can be computed according to Equation 1.

In the follow up step S210, the starting time $t_0$ of one or more frames after the first frame can be computed according to the exposure time $t_e$. Also, the brightness energy information E of one or more frames after the first frame can be computed from Equation 1 by numerical methods with the first set of parameters (i.e., starting time $t_0$ and light intensity A) and the external information (i.e., AC frequency f and exposure time $t_e$). The numerical methods use algorithms that approximate the solution with a certain degree of accuracy and efficiency, and they are widely used in science and engineering to model complex phenomena and systems.

Figure 4:
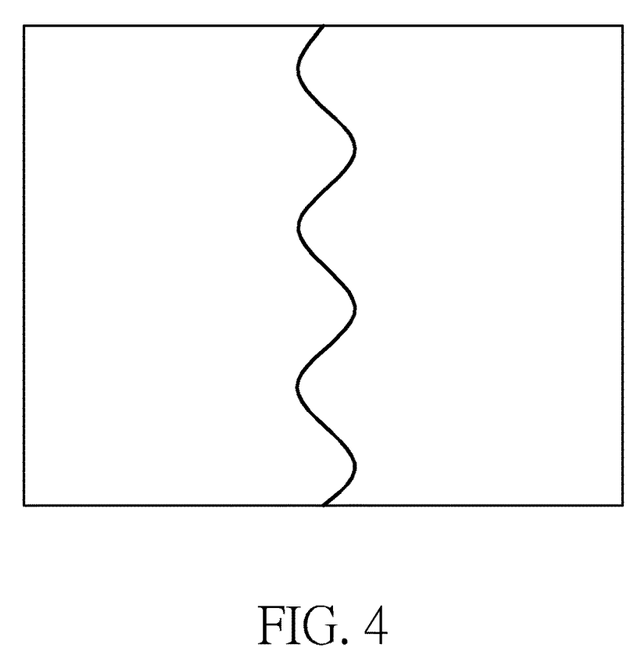
FIG. 4 illustrates the brightness energy information of a frame of an embodiment.

FIG. 4 illustrates the brightness energy information E of a frame computed according to the above-mentioned steps. The brightness energy information E of a frame in this embodiment is a sinusoidal function of time, which matches temporal luminance variation of the AC lighting.

In S212, the de-flicker scalars can be a reciprocal of the brightness energy information E of a frame (i.e., 1/E). Each de-flicker scalar corresponds to a row on the short exposure frame. In S214, by applying (e.g., multiplying) the de-flicker scalar to the corresponding row of the short exposure frame, the banding effect can be removed. Consequently, the short exposure frame is de-flickered. In an analogous way, the corresponding de-flicker scalars can be applied to the next one or more short exposure frames to remove the banding effect so as to de-flicker the frames. Thus, the temporal variations in brightness in the frames can be smoothed out while preserving the details and quality of the original content.

After a number of frames are captured, the lighting condition may change with the frame content, such that the present light condition may be different from that of the first frame. In order to adjust the de-flicker scalars for the renewed lighting condition, the above-mentioned process of de-flickering can be repeated accordingly.

Firstly, in S216 and S218 the image sensors 10 can capture and generate the new short exposure frame and the new long exposure frame. Similarly in S220, the brightness energy information E of the new frame can be computed by applying curve fitting (e.g., linear regression) to the new short exposure frame and the new long exposure frame to obtain estimated values the of brightness energy information E. The external information such as the light frequency f and the exposure time $t_e$ can be collected by the camera 100, e.g., camera setting. In some embodiments, the external information can be provided externally or defined by the user.

Then in S222, with known variables (i.e., brightness energy information E, AC frequency f and exposure time $t_e$) the new set of parameters, (i.e., the starting time $t_0$ and the light intensity A) can be computed according to Equation 1 in an analogous way. It should be noted that both the brightness energy information of the new frame and the frame immediate prior to the new frame are necessary to ensure the continuity of the brightness energy information between two frames such that correct starting time $t_0$ of the new frame can be obtained.

In the follow up step S224, the starting time $t_0$ of one or more frames after the new frame can be computed according to the exposure time $t_e$. Also, the brightness energy information E of one or more frames after the new frame can be computed from Equation 1 by numerical methods with the new set of parameters (i.e., starting time to and light intensity A) and the external information (i.e., AC frequency f and exposure time $t_e$). Due to changes in lighting condition, the values of new set of parameters may be different from the values of the first set of parameters.

Similar to processing the first frame and the N frames after the first frame, in S226 the de-flicker scalars can also be a reciprocal of the brightness energy information E of the frame (i.e., 1/E). Each de-flicker scalar corresponds to a row on the short exposure frame. In S228, by applying (e.g., multiplying) the de-flicker scalar to the corresponding row of the new short exposure frame, the banding effect can be removed. Consequently, the new short exposure frame is de-flickered. In an analogous way, the corresponding de-flicker scalars can be applied to the next one or more short exposure frames to remove the banding effect so as to de-flicker the frames.

Figure 5:
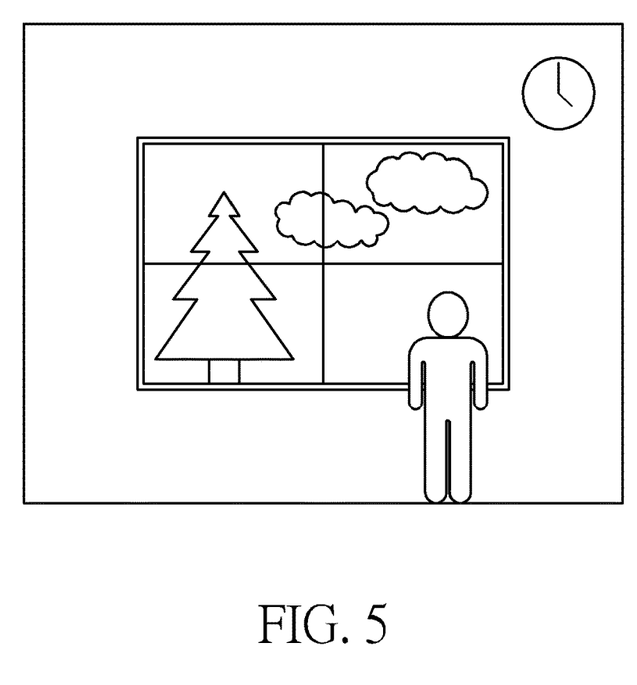
FIG. 5 illustrates a de-flickered short exposure frame of the short exposure frame in FIG. 2A.

FIG. 5 illustrates a de-flickered short exposure frame of the short exposure frame in FIG. 2A. The illustration shows the result of the method 200 for de-flickering frames applied to the short exposure frame in FIG. 2A. The banding effect is removed as the result of the previously described method. Thus, the user of the camera 100 can obtain the image or video without such distortion. The temporal variations in brightness in the frames can be smoothed out while preserving the details and quality of the original content.

In some embodiments, the external information may also include a segmentation map of a frame. A segmentation map is a type of image that assigns a label to each pixel such that pixels with the same label share certain common visual characteristics, indicating which object or region it belongs to. These common visual characteristics include color, texture, shape, and semantic meaning, etc. Segmentation maps are useful for many computer vision tasks, such as object detection, semantic segmentation, instance segmentation, and scene understanding. In addition, segmentation maps can be generated by various methods, such as thresholding, clustering, edge detection, region growing, or deep learning models, and they can be represented in different ways, such as binary masks, color-coded labels, or bounding boxes.

Taking the frame in FIG. 5 as an example, the segmentation map may indicate that there is a window showing the outdoor scene, which is brighter. The other part of the frame may be indicated as indoor scene, which is dimmer. The embodiment can incorporate the information of the segmentation map to process the outdoor scene and the indoor scene separately. As the result, more accurate de-flicker scalars can be obtained, with which the temporal variations in brightness can be smoothed out with more accuracy and more details can be recovered in the de-flickered frame while preserving the original content.

In this article, a method and system for de-flickering frames is disclosed. Compared to conventional methods, the method for de-flickering provided by the embodiments in this work has the advantage of dynamically estimating the de-flicker scalars for different contents and lighting condition to achieve better visual quality, using only a few key frames to obtain the de-flicker scalars for all the frames, real-time processing, and adoptively tuning the number of key frames based on visual quality and computation efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for de-flickering frames captured by a camera, comprising:
    capturing a first frame with short exposure to generate a first short exposure frame;
    capturing the first frame with long exposure to generate a first long exposure frame;
    generating brightness energy information of the first frame according to the first short exposure frame and the first long exposure frame;
    generating a first set of parameters according to the brightness energy information of the first frame;
    generating brightness energy information of N next frames after the first frame according to the first set of parameters and the brightness energy information of the first frame, wherein N is a positive integer; and
    generating de-flicker scalars of the N next frames after the first frame according to the brightness energy information of the N next frames after the first frame.

2. The method of claim 1 further comprising applying the de-flicker scalars to one or more short exposure frames generated by capturing the N next frames after the first frame with short exposure.

3. The method of claim 2, wherein N is adoptively tuned based on required visual quality and computation efficiency of the camera.

4. The method of claim 1, wherein the brightness energy information of the first frame is generated by applying curve fitting to the first short exposure frame and the first long exposure frame.

5. The method of claim 1 further comprising collecting external information, wherein the external information comprises a light frequency, an exposure time of the camera and/or a readout time of rolling shutter.

6. The method of claim 5, wherein the first set of parameters is generated by a following equation:

$$E = \int_{t_0}^{t_0+t_e} A\sin^2(2\pi ft)dt = \frac{A}{4\pi f}[2\pi ft_e - \sin(2\pi ft_e)\cos(2\pi f(2t_0 + t_e))]$$

wherein:
    E represents the brightness energy information;
    A represents the light intensity;
    $t_0$ represents the starting time of capturing the first frame;
    $t_e$ represents the exposure time of the camera; and
    f represents the AC frequency.

7. The method of claim 1, wherein the de-flicker scalars are corresponding to a reciprocal of the brightness energy information of the N next frames after the first frame.

8. The method of claim 1 further comprising:
    after the N next frames are captured, capturing a new frame with short exposure to generate a new short exposure frame;
    capturing the new frame with long exposure to generate a new long exposure frame;
    generating brightness energy information of the new frame according to the new short exposure frame and the new long exposure frame;
    generating a new set of parameters according to the brightness energy information of the new frame and brightness energy information of a frame prior to the new frame;
    generating brightness energy information of M next frames after the new frame according to the new set of parameters and the brightness energy information of the new frame, wherein M is a positive integer;
    generating de-flicker scalars of the M next frames after the new frame according to the brightness energy information of the M next frames after the new frame; and
    applying the de-flicker scalars to one or more next short exposure frames generated by capturing the M next frames after the new frame with short exposure.

9. The method of claim 8, wherein N and M are adoptively tuned based on required visual quality and computation efficiency of the camera, and N equals to M.

10. The method of claim 8, wherein the external information comprises a light frequency, an exposure time of the camera and/or a readout time of rolling shutter.

11. The method of claim 10, wherein the new set of parameters is generated by a following equation:

$$E = \int_{t_0}^{t_0+t_e} A\sin^2(2\pi ft)dt = \frac{A}{4\pi f}[2\pi ft_e - \sin(2\pi ft_e)\cos(2\pi f(2t_0 + t_e))]$$

wherein:
    E represents the brightness energy information;
    A represents the light intensity;
    $t_0$ represents the starting time of capturing the new frame;
    $t_e$ represents the exposure time of the camera; and
    f represents the AC frequency.

12. The method of claim 8, wherein the de-flicker scalars of the M next frames after the new frame are corresponding to a reciprocal of the brightness energy information of the M next frames after the new frame.

13. The method of claim 8, wherein N equals 1 and the frame prior to the new frame is the first frame.

14. A camera for de-flicker frames, comprising:
    an image sensor configured to:
        capture a frame with short exposure to generate a short exposure frame; and
        capture the frame with long exposure to generate a long exposure frame;
    a processor coupled to the image sensor, configured to:
        generate brightness energy information of the frame according to the short exposure frame and the long exposure frame;
        generate parameters according to the brightness energy information of the frame;
        generate brightness energy information of N next frames after the frame according to the parameters and the brightness energy information of the frame, wherein N is a positive integer; and
        generate de-flicker scalars of the N next frames after the frame according to the brightness energy information of the N next frames after the frame.

15. The camera of claim 14, wherein the de-flicker scalars are applied to one or more next short exposure frames generated by capturing the N next frames after the new frame with short exposure.

16. The camera of claim 14, wherein the parameters comprise a light intensity, and a starting time of capturing the frame.

17. The camera of claim 16, wherein the image sensor is further configured to collect external information comprising a light frequency, an exposure time of the camera and/or a readout time of rolling shutter.

18. The camera of claim 17, wherein the parameters are generated by a following equation:

$$E = \int_{t_0}^{t_0+t_e} A\sin^2(2\pi ft)dt = \frac{A}{4\pi f}[2\pi f t_e - \sin(2\pi f t_e)\cos(2\pi f(2t_0 + t_e))]$$

wherein:
E represents the brightness energy information;
A represents the light intensity;
$t_0$ represents the starting time of capturing the frame;
$t_e$ represents the exposure time of the camera; and
f represents the AC frequency.

19. The camera of claim 14, wherein the de-flicker scalars are corresponding to a reciprocal of the brightness energy information of the N next frames after the frame.

* * * * *